July 21, 1959     E. LINDER, JR     2,895,376

OCCLUDERS FOR SPECTACLE ATTACHMENT

Filed April 19, 1955

INVENTOR
EDWARD LINDER JR.
BY
*Louis L. Gagnon*
ATTORNEY

United States Patent Office 2,895,376
Patented July 21, 1959

2,895,376

OCCLUDERS FOR SPECTACLE ATTACHMENT

Edward Linder, Jr., Oreland, Pa.

Application April 19, 1955, Serial No. 502,409

4 Claims. (Cl. 88—20)

This invention relates to optical occluders and has particular reference to the provision of an occluder which may be readily attached to and removed from spectacles and method of making and fitting the same to the wearer.

One of the principal objects of the invention is to provide an optical occluder which may be readily attached to and removed from spectacles and method of making same whereby the resultant occluder will be relatively light in weight, readily adjustable to the requirements of an individual, and which will assume a comfortable intimate cushion contact with the face when placed thereon.

Another object is to provide an occluder of the above character so constructed and fitted with the face as to provide total occlusion of light, for example, as protective means for an inflamed eye or to serve as a shield for a blind, disfigured or removed eye and which may also be used in the treatment of amblyopic cases or for post-operative occlusion.

Another object is to provide a novel method of positioning the occluder in proper relation with the eye and of fitting the same to the orbital brim of the eye and, if desired, for locating and forming a pinhole in the occluder with the assurance of its being aligned with the pupil of the eye for straight-ahead vision therethrough such as for post-operative use.

Other objects and advantages of the invention will become apparent from the following description when taken in conjunction with the accompanying drawings wherein.

Figure 7:
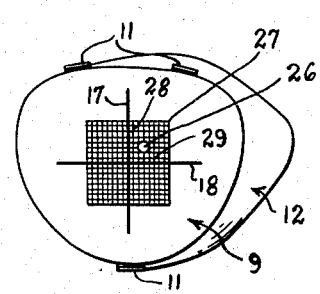
Figure 8:
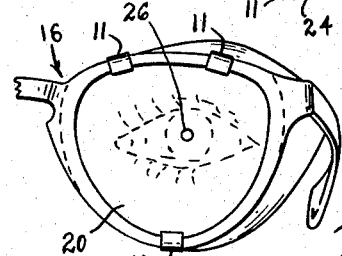

Fig. 7 is a front elevational view of the occluder diagrammatically illustrating the method of locating the pinhole therein when the occluder is to be used for post-operative occlusion; and Fig. 8 is a fragmentary front elevational view of the spectacle and occluder assembly illustrating the position of the occluder with respect to the pupil of the eye for straight-ahead vision through the pinhole formed therein.

Referring more particularly to the drawings wherein like characters of reference designate like parts throughout the several views, the device embodying the invention comprises a front disklike occluder 9 of an irregular contour shape controlled so as to fit with the lens rims of odd-shaped frames of the present style trend. The occluders 9 are formed to different sizes ranging from 36 to 44 mm. in progressive steps differing by 4 mm. with the 36 mm. eye occluder, because of its odd-shaped contour, actually being 38 mm. along the 180° line, the 40 eye occluder actually being 42 mm. along the 180° line and the 44 eye occluder being actually 46 mm. along the 180° line.

The said disklike occluders 9 have imbedded therein and substantially geometrically centered therewith an annular metal portion 10 having a plurality of radially disposed integral finger portions 11 extending outwardly thereof and of the contour edge of said disklike portion 9. The said disklike portions 9 further have an eyecup portion 12 extending rearwardly thereof and provided with a free edge 13 shaped to relatively intimately fit with the orbital brim of the eye with the inner edge portion 14 thereof being shaped to properly fit adjacent the inner canthus of the eye and the outer edge portion 15 being shaped to extend rearwardly and fit with the portion of the face adjacent the outer canthus of the eye.

The disklike occluder portion 9 and the eyecup portion 12 are preferably formed of a suitable opaque non-toxic plastic material such as polyethylene or vinyl which has a yielding, flexible nature and which will permit ease of adjusting and fitting to the requirements of the particular individual wearer by cutting away certain portions of the material, for example, with a pair of scissors or other suitable cutting means. The said disklike occluder portion 9 and the eyecup portion 12 are preferably formed in integral relation with each other by injection molding and with the metal annular portion 10 and fingers 11 being imbedded therein during said injection molding. The annular member 10 and integral finger portions 11 are preferably formed of nickel silver which is readily bendable and which has a desirable resilient nature.

While it has been stated that the disklike occluder portions are formed to different standard sizes, it is also to be understood that the eyecup portions 12 are correspondingly formed to different sizes and the entire occluders are designated as small, medium, large and extra large and are selected for use in accordance with the eye size of the spectacle 16 with which they are to be used and in accordance with the individual's requirements.

It is commonly known in the ophthalmic art that spectacles are formed to different graded sizes primarily varying in progressive steps of 2 mm. usually ranging from 38 to 48 mm. This means, therefore, that the eye sizes of such mountings differ in progressive steps of 2 mm. within the 38 to 48 mm. range. Even though the disklike occluders 9 are preferably held within the 36 to 46 mm. range as heretofore stated they are nevertheless of sizes which may be fitted with the standard range of spectacle sizes. However, if desired they could be formed to the exact size required.

To aid in properly fitting and assembling the occluder with the spectacle of the wearer, the front of the disklike occluder portion 9 is provided with vertically and horizontally disposed cross lines 17 and 18 which intersect each other at the geometrical center of the said disklike occluder 9, as illustrated at 19.

Figure 1:
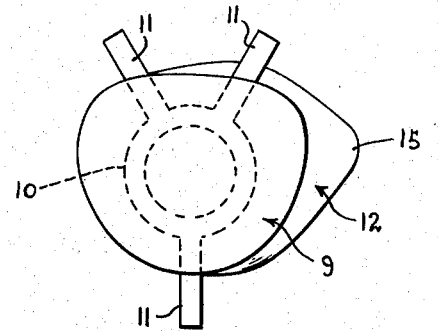
Fig. 1 is a front elevational view of the occluder prior to its being fitted and attached to a spectacle frame.
Figure 2:
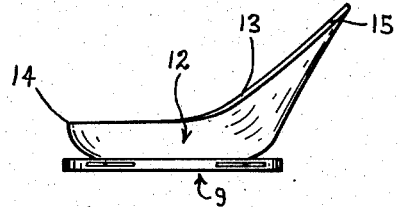
Fig. 2 is a top plan view of the occluder illustrated in Fig. 1.
Figure 3:
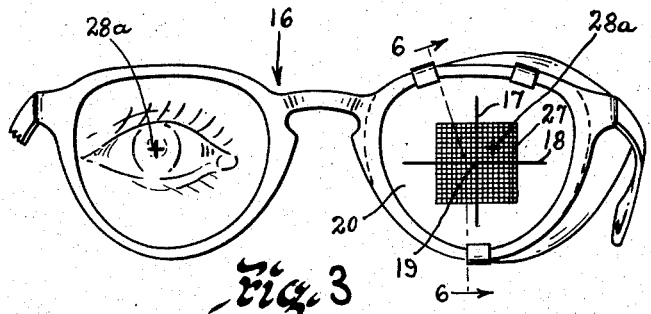
Fig. 3 is a front elevational view of a spectacle frame showing the occluder in attached relation therewith.
Figure 4:
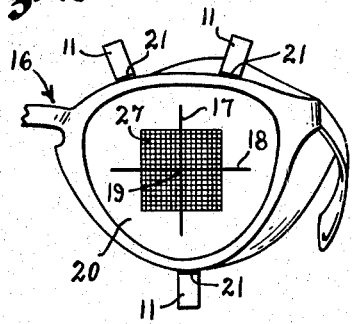
Fig. 4 is a face view diagrammatically illustrating a step in fitting the occluder to the lens rim of the spectacle frame.
Figure 5:
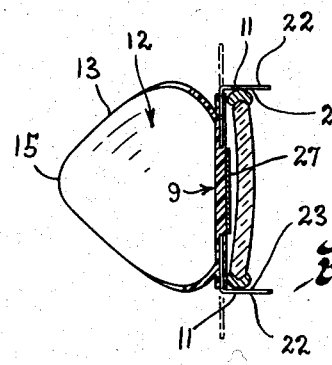
Fig. 5 is a vertical sectional view through the occluder and spectacle frame diagrammatically illustrating another step in the fitting of the occluder to the lens rim of the frame.
Figure 6:
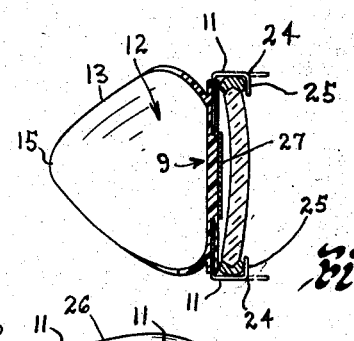
Fig. 6 is a sectional view taken as on line 6—6 of Fig. 3 showing the occluder in fitted relation with the frame.

In fitting the occluder to the spectacle frame, such as diagrammatically illustrated by the numeral 16 in Fig. 3, the intersection point 19 of the cross lines 17 and 18 is aligned substantially with the geometrical center of the lens 20, see Fig. 4, with the lines 17 and 18 being properly horizontally and vertically disposed with respect to the horizontal and vertical axes of the lens. The fingers 11 now lying adjacent and rearwardly of the rim portions of the mounting are each provided with a line marking 21 following the adjacent outer contour of the portions of the rims in the vicinity of said respective fingers. The fingers 11, as illustrated in Fig. 5, are then bent forwardly along the respective lines 21 to a position indicated by the full lines 22. Lines are then placed on the inner surfaces of the fingers 11 at locations 23 aligned with the front plane of the rims. These lines provide the locations at which the second bends 24 are to be formed to provide the inwardly extending portions 25, see Fig. 6. In this manner the proper location and fit of the occluder with the frame is insured. As stated above, the fingers 11 are preferably formed of nickel silver whereby the respective bends may be readily formed and which, after the bends have been formed, will have sufficient resiliency to permit the resultant hooklike gripping portions to be flexed outwardly for removal of the occluder from the spectacles and to thereafter return to their initial set. This flexing also permits the occluders to be placed in resilient gripping relation with the spectacle rims and to have a yielding gripping action therewith. If desired, the annular member 10 and fingers 11 might be formed of stainless steel, beryllium copper or other suitable material.

After the fingers 11 have been bent to have a resiliently gripping action with the spectacle frame, as set forth above, the inner edge 13 of the eyecup is so cut as to have a relatively intimate fit with the face of the wearer. This may be accomplished with any suitable cutting tool, such as a pair of scissors or the like. Due to the fact that the material of the cup portion 12 has a yielding nature it, when properly fitted, will have a comfortable intimate cushion contact with the face. It also is free to yield if the spectacles are accidentally struck or otherwise displaced on the face of the wearer thereby insuring against injury.

While it has been stated that the disklike occluders 9, when all light is to be occluded, are provided with eyecup portions 12, it is to be understood that when only partial occlusion is required the eyecup portions might be omitted.

If it is desired to use the occluder for post-operative occlusion wherein it is desirable that the patient have restricted straight-ahead vision, a pinhole 26 is formed in the disklike occluder portion 9 in alignment with the pupil of the eye, as illustrated in Fig. 8. In order to properly locate the pinhole, the front surface of the disklike portion 9 is provided with a grid 27 having its respective horizontal and vertical lines spaced 1 mm. apart. The said grid is provided with more clearly defined vertical and horizontal cross lines 28 and 29 which intersect each other at the center of the grid and which may be aligned with the respective vertical and horizontal lines 17 and 18 on the face of the disklike occluder 9 to properly locate the grid thereon. The grid is preferably printed on white paper or the like having an adhesive backing by which it may be secured to the front surface of the disklike occluder after it has been properly located thereon. The grid is used to insure that the pinhole is in line with straight-ahead vision of the eyes and in this instance both of the eyes are provided with an occluder.

The procedure in properly locating where the pinhole 26 should be formed is as follows:

The spectacle 16 is checked to be sure that it is properly fitted to the individual. The individual is then asked to fix his eyes at some straight-ahead point at infinity and cross lines 28a are marked on the lenses by the use of a suitable crayon or the like with the intersections of said lines being located at the centers of the pupils of the eyes. The occluders which have been properly fitted to the frame and to the requirements of the wearer, in accordance with the above outlined procedure, are then placed on the lens rims of the spectacle. The location of the point of intersection of the cross lines 28a with respect to the grid 27, as diagrammatically illustrated in Fig. 3, is then noted, taking the readings horizontally from the vertical center line 17 and vertically from the horizontal line 18. The occluders are then removed from the spectacle frame and the holes 26 are drilled through the grid and the disklike occluder 9 at the point indicated by the previous reading. In this particular instance, it will be noted that the point of intersection of the cross lines 28a in Fig. 3 is located 3 mm. to the right of the vertical center line 17 and 3 mm. above the horizontal center line 18. The hole 26, therefore, is located 3 mm. to the right of line 17 and 3 mm. above the line 18, and when the occluders are thereafter placed on the spectacle and the spectacle is placed on the face of the wearer, the pinholes will be in direct line of straight-ahead vision of the eyes. This arrangement is of particular importance in post-operative use, such, for example, in detached retina cases where, subsequent to being operated upon and during the healing period, the eyes should remain relatively static. It is also pointed out that as the healing progresses, the holes 26 may be enlarged to give an increased field of vision.

Although the metal attachment means has been described as being in the form of an annular member 10 having integral fingers 11 thereon, it is to be understood that several other configurations and forms of clip-on attachment means might be used, it being essential, however, that the central area of the disklike occluder be free to permit the forming of the opening 26 therein. If desired, the grid might also be formed as an integral part of the occluder. However, it is preferable to have the same formed separate so that it might be removed after it has served its purpose. It is further pointed out that the contour shapes of the disklike occluder portions 9 are controlled in accordance with the shape of the rims of the spectacles with which they are to be worn.

While it has been defined that the disk occluder 9 and eyecup portion 12 are formed of opaque material, it is to be understood that they might be formed of transparent material and thereafter be provided with an opaque coating, and it is to be understod that when said parts are referred to as an opaque disk or opaque eyecup in the claims, this terminology is to include either of the above-mentioned arrangements. Also, if the disk were formed of transparent material having an opaque coating thereon, all that would be necessary in forming the pinhole 26 would be to remove the coating at the desired location of the pinhole.

It is further to be understood that when total occlusion is not necessary, the eyecup portion may be removed from the disk occluder or the said eyecup portion could be formed of transparent material.

From the foregoing description, it will be seen that simple, efficient and economical means and method have been provided for accomplishing all of the objects and advantages of the invention. However, it is to be understood that various omissions, substitutions and changes in the form and details of the embodiments and method shown and described may be made by those skilled in the art without departing from the spirit of the invention as expressed in the accompanying claims and that all matter herein is to be interpreted as illustrative and not in a limiting sense.

Having described my invention, I claim:

1. An optical occluder for attachment to the rim of a lens supporting frame for occluding an eye of the user, said occluder comprising a front flat opaque disk of distortable plastic material having a contour shape and size to fit rearwardly adjacent the plane of the rim, a metallic washerlike member of a diameter less than the diameter of the disk embedded in said disk with its side surfaces substantially parallel with the side surfaces of the disk and having a plurality of integral adjustable fingers extending radially outwardly thereof and outwardly of the outer contour edge of the disk on opposed sides thereof, an opaque cup portion of yieldable material having a front portion secured to the rear surface of said disk and spaced inwardly of its contour edge and extending rearwardly thereof and having a rear edge portion shaped to have a relatively intimate yielding fit with the face about the eye of the user and said disk having an opening therein inwardly of said washerlike member, said fingers being of a length to permit them to be adjusted to a shape to have a gripping fit with the rim on the opposed sides thereof to hold said occluder in proper position on said rim.

2. An optical occluder for attachment to the rim of a lens supporting frame for occluding an eye of the user, said occluder comprising a front flat opaque disk of distortable plastic material having a contour shape and size generally similar to the shape and size of the rim and fitting rearwardly adjacent the plane of the rim, a metallic washerlike member having a central opening and an outer diameter less than the diameter of the disk embedded in said disk in substantially parallel relation with the side surfaces thereof and having a plurality of integral adjustable fingers extending radially outwardly of the outer contour edge of the disc on opposed sides thereof and an opaque cup portion of yieldable material integrally secured to the rear surface of said disk with its front contour portion spaced inwardly of the outer contour edge of the disk, said opaque cup portion extending rearwardly of the disk and having a rear edge portion shaped to and to have a relatively intimate yielding fit with the face about the eye of the user, said fingers being of a length to permit them to be adjusted to a shape to have a gripping fit with the rim on the opposed sides thereof to hold said occluder in proper position on said rim.

3. An optical occluder for attachment to the rim of a lens supporting frame for occluding an eye of the user, said occluder comprising a front flat opaque disk of distortable plastic material having a contour shape and size generally similar to the shape and size of the rim and fitting rearwardly adjacent the plane of the rim, a metallic washerlike member having a central opening and an outer diameter less than the diameter of the disk embedded in said disk in substantially parallel relation with the side surfaces thereof and having a plurality of integral adjustable fingers extending radially outwardly of the outer contour edge of the disc on opposed sides thereof, an opaque cup portion of yieldable material integrally secured to the rear surface of said disk with its front contour portion spaced inwardly of the outer contour edge of the disk, said opaque cup portion extending rearwardly of the disk and having a rear edge portion shaped to and to have a relatively intimate yielding fit with the face about the eye of the user and said disk having an opening therein inwardly of said washerlike member, said fingers being of a length to permit them to be adjusted to a shape to have a gripping fit with the rim on the opposed sides thereof to hold said occluder in proper position on said rim.

4. An optical occluder for attachment to the rim of a lens supporting frame for occluding an eye of the user, said occluder comprising a front flat opaque disk of distortable plastic material having a contour shape and size to fit rearwardly adjacent the plane of the rim, a metallic washerlike member having an open central area and an outside diameter less than the diameter of the disk embedded in said disk with its side surfaces substantially parallel with the disk, said washerlike member having a plurality of integral adjustable fingers extending radially outwardly of the outer contour edge of the disk on opposed sides thereof, an opaque cup portion of yieldable material integrally secured to the rear surface of said disk and spaced inwardly of its contour edge and extending rearwardly thereof and having a rear edge portion shaped to have a relatively intimate yielding fit with the face about the eye of the user, said fingers being adjustable to a shape to have a gripping fit with the rim on the opposed sides thereof to hold said occluder in a predetermined position on said rim and the front of said disk having a grid of uniformly spaced horizontal and vertical lines on the front surface thereof with the point of intersection of the horizontal and vertical center lines of said grid aligned with the geometrical center of said disk.

References Cited in the file of this patent

UNITED STATES PATENTS

| | | |
|---|---|---|
| 397,744 | Meyrowitz et al. | Feb. 12, 1889 |
| 459,563 | Groh | Sept. 15, 1891 |
| 569,117 | Mosher | Oct. 6, 1896 |
| 730,192 | Moritz | June 2, 1903 |
| 1,263,713 | Smith | Apr. 23, 1918 |
| 1,425,919 | Tremblay | Aug. 15, 1922 |
| 1,452,909 | Covelle | Apr. 24, 1923 |
| 1,630,193 | Mallory | May 24, 1927 |
| 1,876,769 | Sheffield | Sept. 13, 1932 |
| 1,914,931 | Tynan | June 20, 1933 |
| 2,172,573 | Blumenthal | Sept. 12, 1939 |
| 2,190,582 | Wolf | Feb. 13, 1940 |
| 2,308,200 | Nerney | Jan. 12, 1943 |
| 2,410,729 | Glazer | Nov. 5, 1946 |

FOREIGN PATENTS

| | | |
|---|---|---|
| 521,138 | Great Britain | May 13, 1940 |